United States Patent Office 3,335,116
Patented Aug. 8, 1967

3,335,116
REACTION PRODUCTS OF ALKYLENE IMINES AND ALKYLENE VICINAL EPISULFIDES, AND PROCESS THEREFOR
Norman Rosenthal, Tuxedo, N.Y., and Louis Citarel, Brussels, Belgium, assignors to Thiokol Chemical Corporation, Bristol, Pa., a corporation of Delaware
No Drawing. Filed Sept. 11, 1964, Ser. No. 395,939
12 Claims. (Cl. 260—79)

This invention relates to the novel monomeric and polymeric reaction products of alkylene imines and alkylene vicinal episulfides.

An object of the present invention is to provide a novel class of monomeric reaction products of alkylene imines and alkylene vicinal episulfides.

Another object of the present invention is to provide a novel class of polymeric reaction products of alkylene imines and alkylene vicinal episulfides.

Still another object of the present invention is to provide novel methods for the production of monomeric and polymeric reaction products of alkylene imines and alkylene vicinal episulfides.

Other objects of this invention are apparent from and inherent in the following disclosure.

Unexpectedly, it has been discovered that (i) alkylene imines, as depicted by the formula (I)
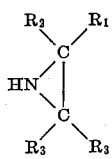

wherein $R_1$, $R_2$, $R_3$, and $R_4$ are in general chemical groups which are inert to reaction with episulfides, such as alkyl, alkylether, and hydrogen groups, and preferably wherein $R_1$ is hydrogen or an alkyl grouping having from one to six carbons, and $R_2$ to $R_4$ are hydrogen or methyl, may be caused to react with (ii) alkylene vicinal episulfides, as depicted by the formula (II)
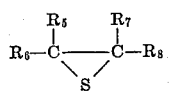

wherein $R_5$ to $R_8$ are, in general, chemical groups which are inert to reaction with imine groups, i.e. aziridine groups, such as those chemical groups devoid of "active hydrogen" as defined by the Zerewitinoff method (Zerewitinoff, Ber. 40, 2023 (1907); Ber. 41, 2236 (1908); Kohler, J. Am. Chem. Soc. 49, 3181 (1927)), and include among others hydrogen, alkyl, and alkylether groups, and preferably hydrogen or alkyl groups having from one to about six carbon atoms, to provide novel monomeric reaction products generally conforming in structure to that depicted by the formula (III)
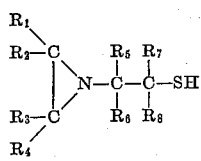

wherein $R_1$ to $R_8$ are as previously defined, and novel polymeric reaction products generally forming in structure to that depicted by a formula such as (IV)
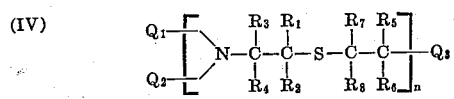

wherein $Q_1$ is hydrogen, or the repeating unit

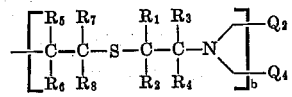

$Q_2$ is hydrogen, or

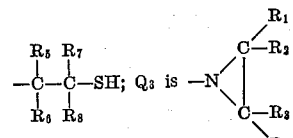

or hydrogen, or

$Q_4$ and $Q_5$ are hydrogen, or $Q_1$; $n$ is a positive number greater than one and preferably less than 1000; and $b$ is a positive whole number less than 1000.

It is believed that in the formation of the instant polymers, the instant monomers are first formed, and then undergo polymerization, such as autopolymerization. This reaction route occurs, it is believed, because the aziridinal nitrogen of the monomer may be made highly reactive due to the presence of a sulfur in beta position to it, and because the terminal mercaptan is made substantially acidic, in turn, by the presence of nitrogen beta to the sulfur; thus a mutual enhancement of the reactivity of the mercaptan and aziridinyl groups results to the degree that the mercaptan may then open the imine ring.

The instant polymers obtained have shown evidence of having primary amine, mercaptan and aziridine groups present, especially at low degrees of polymerization, i.e. when liquid polymers are formed. It is believed that these active groups are terminal on some of the polymer molecules, such as would occur, in the case of the presence of primary amine when $Q_1$ and $Q_2$, or $Q_2$ and $Q_4$, or $Q_1$ and $Q_5$ are hydrogen in Formula IV above; and such as would occur, in the case of the presence of mercaptan, when $Q_2$ is not hydrogen; and such as would occur, in the case of the presence of aziridine groups, when $Q_1$ is not hydrogen in Formula IV above. Some of the solid polymers of this invention give evidence of a highly crosslinked structure, such as would occur when $Q_2$ is not hydrogen in Formula IV above, and branching occurs at the nitrogen.

At any event, the instant polymers have sulfur in the backbone preponderantly in the form of monosulfide linkages, viz.

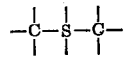

occasionally in the form of disulfide, and nitrogen in the backbone in the form of secondary and/or tertiary amines. This does not occur when oxygen is the chalcogen involved, as, for example, in the reaction between epoxides and imines, viz. U.S. Patent 3,006,912. Such reaction products are invariably alcohols which can not polymerize per se to form polyethers no less elastomeric polyethers. The present polymers are unusual in other respects. Autopolymerization produces, in general, highly crosslinked polymers, many of which are elastomeric, thus giving rise to a new generation of monosulfide rubbers.

This invention employs alkylene imines as reactants, viz.

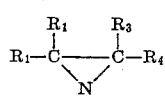

Among such useful imines are aziridinal compounds in the following classes: alkyl-substituted imines, such as propylenimine

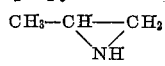

1,2-butylenimine

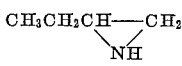

2,3-butylenimine

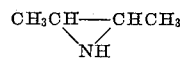

2-methyl propylenimine

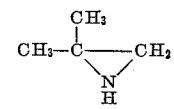

etc.;
alkylether-substituted imines, such as 3-methoxypropylenimine

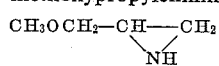

1,3-dibutoxypropylenimine

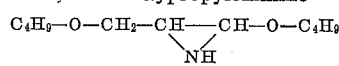

1-methyl-1,4-diethoxybutylenimine-2,3

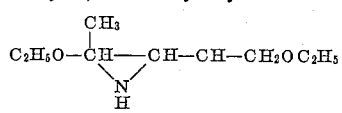

1-ethylene gem diether(propylenimine)

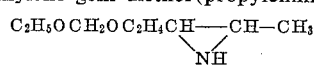

etc.; and imines that are substituted with more than one in number and/or type of the foregoing groupings, such as

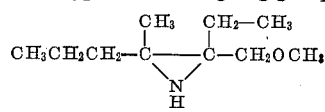

The aforesaid imines undesirably are capable of homopolymerization in the presence of acids, usually with violence and great evolution of heat. Thus, according to the present invention, the imines are to be used in the present process in the absence of the undesirable acidic materials, such as inorganic, organic, and other Lewis acids and their acidic salts, phenolic materials, etc.; thus they must be freed of such impurities before use. Such polymer formation is characteristic of the initial presence of imine groups.

This invention employs alkylene vicinal episulfides, viz.

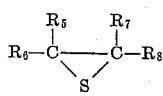

Among such useful episulfides are vicinal compounds in the following classes: alkyl-substituted vertical episulfides, such as 1,2,-propylene episulfide

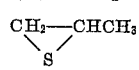

2-methyl-propylene episulfide-1,2

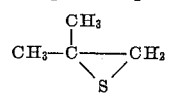

3,4 dimethyl heptylene episulfide-3,4

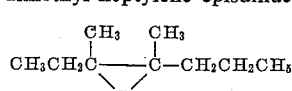

etc.;

alkylether-substituted vicinal episulfides, such as 2-methoxy ethylene episulfied

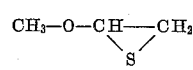

1,2,-propylene episulfide-1-diethyl ether

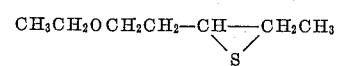

etc.: and vertical episulfides that are substituted with more than one of the foregoing, such as

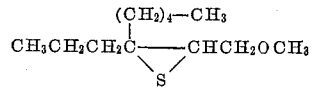

Such vicinal episulfides are capable of homopolymerization in the presence of both Lewis acids and bases to form solid or liquid polymers. Thus, according to the present invention, vicinal episulfides are to be used in the absence of acidic and/or basic materials, and where used in the presence of solvents, must be used only with aprotic solvents, avoiding even such as water, alcohols, etc. which in other contexts are not commonly considered acidic or basic. The vicinal episulfides thus must be freed of such impurities before use.

Preparation of monomers of this invention ordinarily and desirably may be carried out in the absence of foreign catalytic material, and in the presence of an aprotic organic solvent. Among such useful solvents may be included liquid alkanes, such as n-hexane, or n-heptane, chlorinated alkanes, such as chloroform, carbon tetrachloride, perchloroethylene, etc., hydrocarbon ethers, such as diethyl-gem-diether, diethyl ether, liquid aromatic hydrocarbons such as benzene, etc., and saturated cyclic hydrocarbons such as decahydronaphthalene. In selecting a solvent according to the present invention, it is desirable to use one which has a boiling point higher than either the specific imine, the specific episulfide, or the monomer produced therefrom to minimize autopolymerization of the monomer; however, when monomer formation is carried out in the lower portion of the useful temperature range, say at or below 50° C. considerations of the respective boiling points are not especially important to the successful practice of the instant invention.

According to the present process, the imine and vicinal episulfide reactants, previously purged of foreign deleterious substances such as water and Lewis acids and bases, are intimately admixed in the presence of a suitable aprotic solvent, also previously so purged. The admixture, usually a solution, is then permitted to endure reaction at temperatures of about 20° C. to 120° C. for periods of from about 1 hour to about 72 hours at pressures of about one atomsphere to the autogenous pressures of the reaction system at the reaction temperature. The liquid monomer product is recovered from the pot product mixture by filtering, to separate solids therefrom, and by fractional distillation to separate it from the aprotic solvent. In the recovery step, it is preferred to carry out the distillation at temperatures below about 75° C., wherever possible, and under reduced pressures, i.e. less than one atmosphere. The present monomers are also useful in ways other than that of autopolymerization to form the present novel polymers, among which may be included use (1) as a reactive comonomer which epoxides in acid catalyzed reactions to form useful copolymers;
(2) as a reactive coreactant with carbonyls to form useful thioketals that may find possible use as medicinals; and;
(3) as a coreactant with carboxylic acids to form valuable esters for possible medicinal uses; etc.

Polymers of the present invention may be prepared either directly from imine and vicinal episulfide reactants, or by the autopolymerization of the present monomers which had been previously isolated as such. The present polymers may be liquid, as when the sum of $n$ and $b$ of the foregoing Formula IV are less than about 10; or solids, some of which may be elastomeric in nature. The present invention also contemplates polymers which are interpolymers formed from mixtures of more than one imine and more than one vicinal episulfide, or formed from the autopolymerization of mixtures of more than one type of the present monomers, such as where the substituents $R_1$ to $R_8$ on some monomers employed therefor are different than the substituents $R_1$ to $R_8$ on the other monomers used therein. Autopolymerization occurs, according to this invention, to substantial degrees at temperatures between about 90° C. and 150° C., endured for periods from about 4 hours to about 72 hours. The degree of polymerization, commonly abbreviated as DP, in general, depends herein upon the specific temperatures and times used, and upon the reactivity of the specific monomers employed. The higher the temperature within the foregoing temperature range the greater the DP. With respect to reactivity of the monomers, the more highly substituted the specific monomers, in general, the lower the degree of polymerization enjoyed by the polymer provided at a given temperature in a given time interval. Many of the present polymers are useful as elastomeric substances that may be formed into end articles. The present polymers are unusually resistant to dissolution in aqueous and organic solutions, and thus to attack by water moisture and common organic solvents such as ketones, chlorinated hydrocarbons, ethers, etc, the following examples illustrate embodiments of the present monomers, polymers and processes, but are not intended to limit the scope of the invention as defined by the claims.

EXAMPLE 1

*Preparation of mercaptoethylenimine*

A closed reaction vessel was charged with 33 g. (0.5 mol) of dried and purified ethylene episulfide and 22 g. (0.5 mol) of dried and purified ethylenimine in 100 ml. of chloroform. The reactants were stirred for about 4 hours at about 20 to 25° C., and at the end of 30 minutes thereof showed a positive nitroprusside test for mercaptan. No solid products were formed. The liquid product mixture was concentrated by vacuum removal of solvent at about 25 to 30° C. The concentrated liquid product, about 17 g. was distilled at 15 to 10° C. and 0.01 mm. Hg. The distillate obtained, 8 g., was a clear liquid monomer. The monomer product gave a strongly positive nitroprusside test for mercaptan. It had a refractive index $(n_D^{24})$ of 1.4824, a density, $(d_4^{24})$ of 0.98 g./cc., and a molar refractivity (MR) of 30.1. The calculated molar refractivity for 2-mercaptoethylenimine, viz.

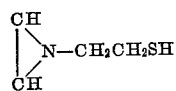

is 30.2

EXAMPLE 2

*Liquid polymer of 2-mercaptoethylenimine of low DP, and solid elastomeric polymer*

A closed reaction vessel was charged with 18 g. (0.3 mol) of dried and purified ethylene episulfide and 12.9 g. (0.3 mol) of dried and purified ethylenimine in solution of 200 ml. of dried benzene. The vessel was placed in an oven set at 100° C. for 16 hours. The reaction products were then distilled:

Cut #1, 5 g. of liquid distilled at 64–69° C. and atmospheric pressure;
Cut #2, 192 ml. of benzene distilled at 78–81° C. and atmospheric pressure;
Cut #3, 4.3 g. of a liquid polymer was distilled under vacuum at 60–65° C. and 19 mm. Hg; and the
Pot residue remaining, 10.5 g., was a yellow rubbery polymer.

The liquid polymer obtained at Cut #3 showed the presence of mercaptan, a three-membered ring, and amine by infra-red analysis. It analyzed at 12.35 and 12.66% nitrogen vs. 13.6% calculated, and 26.62 and 26.82% sulfur vs. 31% calculated for elemental analysis of polymers of low DP. Also, the liquid polymer showed a $n_D^{28}$ of 1.4820.

EXAMPLE 3

In similar manner to Example 2, ethylene episulfide and ethylenimine were caused to react at 120° C. The reaction products were filtered, and the filtrate distilled to yield a liquid polymer of low DP at 54–56° C. and 24 mm. Hg, which gave a strong nitroprusside test for mercaptan, a violent strongly exothermic polymerization to a solid with concentrated hydrochloric acid, thus indicating the presence of intact aziridine rings, and an $n_D^{25}$ of 1.4946. The pot product remaining had polymerized to form a rubbery solid which was insoluble in water and common organic solvents. Upon testing with KCN and then nitroprusside, the rubbery polymer showed weak mercaptan reaction, indicating the possible presence of some disulfide linkages in the polymer, and also a high degree of cross-linking.

EXAMPLE 4

Ethylene episulfide and ethylenimine were reacted for 6 hours at 100° C. in 250 ml. of dried decahydronaphthalene in similar manner to Example 2. The supernatant liquid was separated from a solid residue by distillation to provide 2 g. of a clear liquid polymer distillate at 40–45° C. and 12 mm. Hg, which had an $n_D^{26}$ of 1.4855.

EXAMPLE 5

In similar manner to Example 4, ethylene episulfide and ethylenimine were reacted for 16 hours. About 24.5 g. of a tan polymeric solid product was separated from the supernatant liquid. The liquid product mixture was then distilled to provide two fractions and a liquid residue:

| Fraction | Weight, g. | Boiling Point, °C. | Pressure, mm. Hg | $n_D^{20}$ |
|---|---|---|---|---|
| 1 | 1.3 | 41–45 | 11 | 1.5114 |
| 2 | 2.6 | 53–55 | 9 | 1.4716 |
| Residue | 168 | Decahydronaphthalene | | 1.4701 |

Fraction 1 was a liquid polymer of higher DP than that obtained in Example 4. Fraction 2 was heavily contaminated with decahydronaphthalene.

EXAMPLE 6

In similar manner to Example 1, 1 mol of ethylene episulfide and 1 mol of ethylenimine were reacted. After removal of the chloroform, the pot product was distilled:

| Fraction | Weight, g. | Boiling Point, °C. | Pressure, mm. Hg | $n_D^{20}$ |
|---|---|---|---|---|
| 1 | 70 | 45–50 | 60–65 | |
| 2 | 14 | 52–54 | 22–23 | 1.5010 |
| Residue | Not distillable at 100–110° C. and 0.3 mm. Hg | | | |

Fraction 1 was believed to be the monomer, 2-mercaptoethyleneimine, or a liquid polymer thereof with a very low DP. Fraction 2 was a liquid polymer of low DP with a refractive index which increased within one week of storage at 25° C. to an $n_D^{24}$ of 1.5455. Fraction 2 showed a percent nitrogen content of 13.46 and 13.82% versus a percent nitrogen calculated for liquid polymers of low DP of 13.6%.

EXAMPLE 7

*Preparation of 2-mercaptoethylpropylenimine*

A closed reaction vessel was charged with 18 g. (0.2 mol) of dried and purified ethylene episulfide and 17.1 g. (0.3 mol) of dried and purified propylenimine in 250 ml. of dried benzene, and heated to 105° C. for about 16 hours. The product mixture obtained was filtered, and benzene and other volatiles were removed from the filtrate under vacuum at about 25° C. The clear liquid remaining was obtained in 1 g. yield, and distilled at 29 to 30° C. at 3 mm. Hg. The monomer product, 2-mercaptoethylpropylenimine, had an $n_D^{25}$ of 1.4765.

EXAMPLE 8

*Preparation of N-[1-methyl-2-mercaptoethylene] ethylenimine and polymer thereof*

A closed reaction vessel was charged with 22 g. (0.3 mol) of dried and purified propylene episulfide and 12.9 g. of dried and purified ethylenimine in 250 ml. of dried benzene and heated at 120° C. for about 16 hours. The liquid supernatant obtained was distilled to remove benzene at 56 to 60° C. and 760 mm. Hg. A liquid monomer, about 3 g. remained in the pot, which distilled at 35 to 36° C. and 3 mm. Hg. The solids remaining after reaction were a rubbery polymer with a strong odor of mercaptan. The monomer was N-[1-methyl-2-mercaptoethylene]ethylenimine. It had an $n_D^{24}$ of 1.4827, showed the presence of mercaptan upon infra-red analysis and with nitroprusside. The rubbery polymer was boiled in water to help oxidize mercaptan and form disulfide linkages. The test for mercaptan after boiling was negative, and for disulfide positive upon treatment with KCN and then with nitroprusside.

The polymers of this invention, when subjected to sodium fusion, give evidence of having both sulfur and nitrogen in their backbone structure.

We claim:
1. A compound having the formula

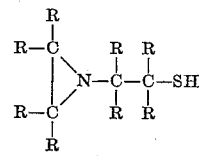

wherein all the R groups may be same or different and are selected from the group consisting of hydrogen, alkyl and alkylether groups.

2. A compound as in claim 1 wherein all the R groups are hydrogen groups.
3. A compound as in claim 1 wherein at least one of said R groups is a methyl group and the remainder of said R groups are hydrogen groups.
4. 2-Mercaptoethylpropylenimine.
5. N-[1-methyl-2-mercaptoethylene]ethylenimine.
6. A polymeric reaction product of at least one alkylene imine and at least one alkylene vicinal episulfide which product has terminal groups selected from the group consisting of hydrogen, mercaptan and aziridine groups and a structure intermediate of said terminal groups comprising repeating units of the formula

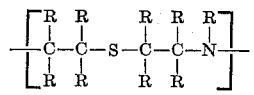

wherein the R groups are the same or different and are selected from the group consisting of hydrogen, alkyl and alkylether groups.

7. A polymeric reaction product as in claim 6 wherein all of said R groups are hydrogen groups.
8. A polymeric reaction product as in claim 6 wherein at least one of said R groups is a methyl group and the remainder of said R groups are hydrogen groups.
9. A polymer of claim 6 which is a liquid.
10. A polymer of claim 6 which is a solid.
11. A polymer of claim 10 which is an elastomer.
12. A process comprising reacting at least one vicinal episulfide monomer with at least one alkylene imine at a temperature of about 20° C. to 150° C. for about 1 to 72 hours and recovering the reaction product.

References Cited
UNITED STATES PATENTS

| | | | |
|---|---|---|---|
| 2,785,191 | 3/1957 | Schwyzer | 260—239 |
| 3,071,593 | 1/1963 | Warner | 260—327 |
| 3,240,720 | 3/1966 | Smith | 260—2 |

DONALD E. CZAJA, *Primary Examiner.*

LEON J. BERCOVITZ, *Examiner.*

M. I. MARQUIS, *Assistant Examiner.*

UNITED STATES PATENT OFFICE
CERTIFICATE OF CORRECTION

Patent No. 3,335,116                              August 8, 1967

Norman Rosenthal et al.

It is hereby certified that error appears in the above numbered patent requiring correction and that the said Letters Patent should read as corrected below.

Column 1, lines 29 to 34, for the lower left-hand portion of the formula reading "$R_3$" read -- $R_4$ --; column 4, line 15, for "episulfied" read -- episulfide --; line 23, for "vertical" read -- vicinal --; column 5, line 63, for "15 to 10° C." read -- 15 to 20° C. --; column 8, lines 26 to 29, the formula should appear as shown below instead of as in the patent:

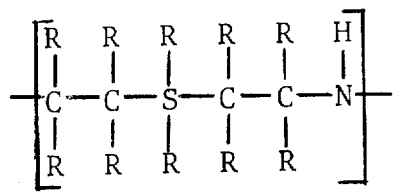

Signed and sealed this 6th day of August 1968.

(SEAL)
Attest:

EDWARD M. FLETCHER, JR.                     EDWARD J. BRENNER
Attesting Officer                             Commissioner of Patents